United States Patent
Lange et al.

(10) Patent No.: US 9,589,172 B1
(45) Date of Patent: Mar. 7, 2017

(54) SYSTEMS AND METHODS FOR INTERACTIVE IMAGE ANALYSIS OF DIGITAL PATHOLOGY IMAGES

(71) Applicant: Flagship Biosciences, Inc., Westminster, CO (US)

(72) Inventors: Holger Lange, Nordrhein-Westfalen (DE); Trevor Johnson, San Diego, CA (US)

(73) Assignee: FLAGSHIP BIOSCIENCES, INC., Westminster, CO (US)

( * ) Notice: Subject to any disclaimer, the term of this patent is extended or adjusted under 35 U.S.C. 154(b) by 134 days.

(21) Appl. No.: 14/052,773

(22) Filed: Oct. 14, 2013

Related U.S. Application Data (60) Provisional application No. 61/769,068, filed on Feb. 25, 2013.

(51) Int. Cl.
*G06K 9/00* (2006.01)
(52) U.S. Cl.
CPC ................ *G06K 9/00127* (2013.01)
(58) Field of Classification Search
None
See application file for complete search history.

(56) References Cited

U.S. PATENT DOCUMENTS

| | | | |
|---|---|---|---|
| 6,718,053 B1* | 4/2004 | Ellis et al. | 382/128 |
| 7,831,075 B2* | 11/2010 | Wilson et al. | 382/128 |
| 2005/0136549 A1* | 6/2005 | Gholap et al. | 436/501 |
| 2010/0111396 A1* | 5/2010 | Boucheron | 382/133 |
| 2015/0004630 A1* | 1/2015 | Lange et al. | 435/7.21 |

* cited by examiner

*Primary Examiner* — Tahmina Ansari
(74) *Attorney, Agent, or Firm* — Coastal Patent Law Group, P.C.

(57) ABSTRACT

Data processing systems and methods are provided that improve the perceived efficiency of image analysis tools in a digital pathology workflow when challenged by analyzing large size microscopic images. Various embodiments utilize a separation of the image analysis programs into a first automatically executed segment that requires no user interactions for identification and quantification of object data of processed images, and a second interactive segment for accepting user input. User interactions are only applied to the already calculated object data resulting in an improved system response time. A tile-based processing scheme with concurrent processing and generation of object data in a tile-based data format provides further performance improvements of the system.

17 Claims, 6 Drawing Sheets

Nuclei: H-Score  98
Nuclei: % 0  53.70
Nuclei: % 1  13.118
Nuclei: % 2
Nuclei: % 3  18.65

FIG. 6

Nuclei: H-Score  151
Nuclei: % 0  31.68
Nuclei: % 1  15.35
Nuclei: % 2
Nuclei: % 3  29.70

FIG. 7

SYSTEMS AND METHODS FOR INTERACTIVE IMAGE ANALYSIS OF DIGITAL PATHOLOGY IMAGES

CROSS-REFERENCE TO RELATED APPLICATIONS

This application claims benefit of priority with U.S. Provisional Application Ser. No. 61/769,068, filed Feb. 25, 2013.

BACKGROUND

Field of the Invention

This invention relates to digital pathology image analysis tools.

Description of the Related Art

Microscopes provide high-resolution imagery that, when digitized, often provide very large digital images. For example, typical whole slide tissue sections acquired with a 20× or 40× objective often yield image sizes of 25 k×25 k pixels or 100 k×100 k pixels, respectively. The process of running image analysis programs, such as those for pathology analysis, on these large data images, tends to consume a considerable amount of time. Depending on the sophistication of the programs, analyzing an image of a whole slide tissue section can take up to several hours.

Where a user is required to run image analysis programs, this results in a complex workflow. The user must first provide all inputs and start the execution of the program, then return later to view the results. When the user is required to interact with the image analysis programs more frequently, the resulting workflow becomes even more complex, often to the point of being impractical.

There is a need for systems and methods that can be used to build image analysis tools that provide a perceived close to real-time system response.

SUMMARY

Data processing systems and methods are provided that improve the perceived efficiency of image analysis tools in a digital pathology workflow when challenged by analyzing large size microscopic images. Various embodiments utilize a separation of the image analysis programs into a first automatically executed segment that requires no user interactions for identification and quantification of object data of processed images, and a second interactive segment for accepting user input. User interactions are only applied to the already calculated object data resulting in an improved system response time. A tile-based processing scheme with concurrent processing and generation of object data in a tile-based data format provides further performance improvements of the system.

BRIEF DESCRIPTION OF THE DRAWINGS

Embodiments of the invention will be described with reference to the following figures, wherein:

FIGS. 2(A-B) illustrate a tile-based image processing scheme for use in the pathology analysis process.

DETAILED DESCRIPTION OF THE PREFERRED EMBODIMENTS

Embodiments herein address the longstanding problem that image analysis tools working on large size microscope images do not provide adequate system response. This problem can be overcome by: (i) designing image analysis programs in two parts: a first part that performs the low-level image analysis (processing intensive) without requiring user interactions and a second part that only performs the high-level image analysis associated with user interactions, (ii) by implementing a fast access tile-based data structure for the object data that provide the interface between the low-level and high-level image analysis programs, and (iii) by implementing a control logic that executes automatically all image analysis programs that do not require user interactions.

Image analysis tools are based on image analysis programs that are either executed by a system or user. Image analysis programs that do not require user interactions are hereinafter referred to as "automated" image analysis programs, and those that require user interactions are hereafter referred to as "interactive" image analysis programs.

In a general embodiment, a system for digital pathology analysis is configured to execute the automated image analysis programs automatically upon availability of the images of corresponding slides to be digitized and analyzed. The system implements a control logic that identifies the appropriate programs to be executed. In some cases, there is only one program that needs to be executed for a slide, and then the required control logic can be implemented with a simple lookup table. In other cases, there are programs that require multiple slides or other image analysis results as their input, and then the control logic becomes more complex. One possible design of this control logic is based on defining all required inputs for the programs and then to execute the programs when all of their inputs are available. Each program can have multiple slides and/or multiple image analysis results as its input. This way we can define a hierarchy of image analysis programs, where the availability of one new image of a slide can trigger the execution of a sequence of image analysis programs.

A slide identifier is used, the slide identifier can be constructed from information about a slide, for example: tissue type and stain, to identify the individual slides.

A slide-set identifier is also used, the slide set identifier can be constructed from information about a slide, for example: unique specimen/block identification number, to identify slides that are analyzed together or within a grouping.

A program identifier is used to identify an image analysis result.

Slide inputs are defined using the corresponding slide identifiers and the image analysis result inputs using the corresponding program identifiers. When a program has multiple inputs, then all inputs must have originated from slides with the same slide-set identifier. Each time an image of a slide becomes available or a program provides new image analysis results, the control logic determines if a new program needs to be executed.

The system indicates to the user when the image analysis has been completed. When a user then opens the image, the corresponding image analysis results are available instantaneously. Ideally, all image analysis programs should be designed to not require user interactions, which would result in image analysis tools that have an instantaneous system response.

The execution time of the automated image analysis program adds to the time the user has to wait before he or she can access the image of a slide and its results. But after this initial waiting period, which can be considered part of the slide preparation process, there is no further waiting time for the user before analysis can continue.

Taking advantage of parallel processing techniques and multiple processors can shorten the execution time of the automated image analysis programs. The image analysis programs and the digitization of the slides can be performed in parallel using double-buffer techniques. Double buffer techniques are known by those having skill in the art and can be implemented with little experimentation. The different image analysis programs can be processed in parallel on multiple processors.

Additionally, a tile-based processing scheme can be used for the image analysis programs such that all tiles can be processed in parallel.

The image analysis programs are designed with two separate image analysis portions or segments. A first automated image analysis segment provides the low level image processing with object data as an output and that does not include any user interactions. The other image analysis segment, referred to as the interactive segment, uses the object data from the automated segment as input data and implements only the processing that is associated with user interactions. The interactive segment further provides a platform for high-level image processing. With reduced processing in the interactive segment, the responsiveness of the image analysis tools is improved. With this in mind, the user only has to wait for the automated processing of the objects, which is much faster compared to current techniques.

It is important to note that automated image analysis programs can have parameters that need to be tuned for an application. But once tuned, all the parameters are locked and user interactions are no longer required for the execution of the program. Thus, only initial tuning is required and subsequent runs become fully automated after initial adjustment and fine tuning.

Some programs that provide the low-level image processing cannot be designed without user interactions. In its simplest form it could be a quality control step of the image analysis results provided by the automated image analysis programs. The system allows running a low-level image analysis program as an interactive program triggered by the user. The users of the low-level image analysis programs and high-level image analysis programs can be different, so that the user of the high-level image analysis program still does not perceive a delay in the system response.

Figure 1:
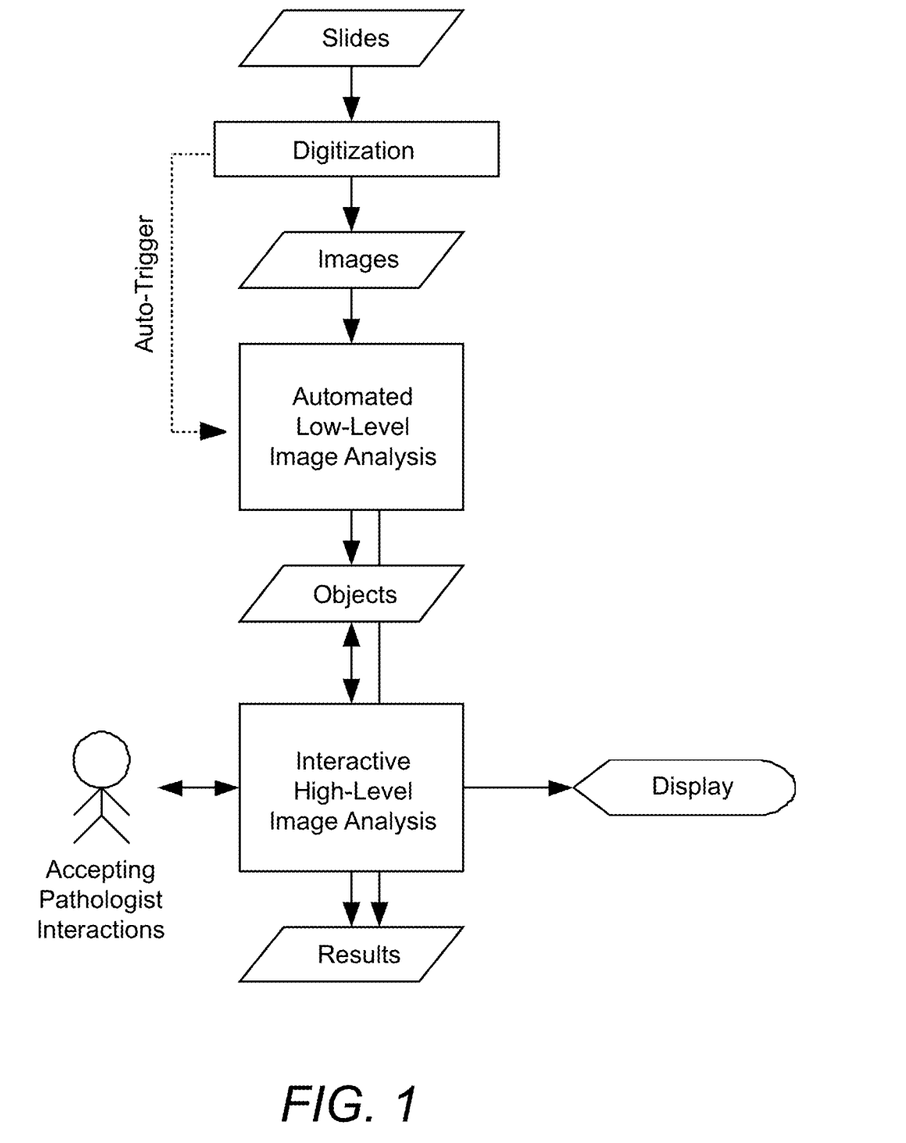
FIG. 1 shows a pathology analysis process from preparation and digitization of slides to final image analysis results in accordance with an embodiment.

FIG. 1 shows the process from digitization of slides to the final image analysis results. The first step is the digitization of the slides to images on a computer system. The digitization process triggers the automated low-level image analysis programs when the images are available for processing. The second step is the automated low-level image analysis that generates the object data and optionally temporary image analysis results. The third step is the interactive high-level image analysis that is initiated by a user. The interactive high-level image analysis is based on the detected objects and provides the final image analysis results based on the provided user inputs.

In an embodiment, the system can provide a tile-based data structure for the object data. A tile-based data structure provides simple and fast access to the object data for viewing and processing. To display or process the objects for a region of the image (e.g. entire screen) only the object data from the tiles that overlap with that region need to be loaded.

A tile-based processing scheme works well for the image analysis of large images and can generate the object data automatically in a tile-based manner.

Figure 2A:
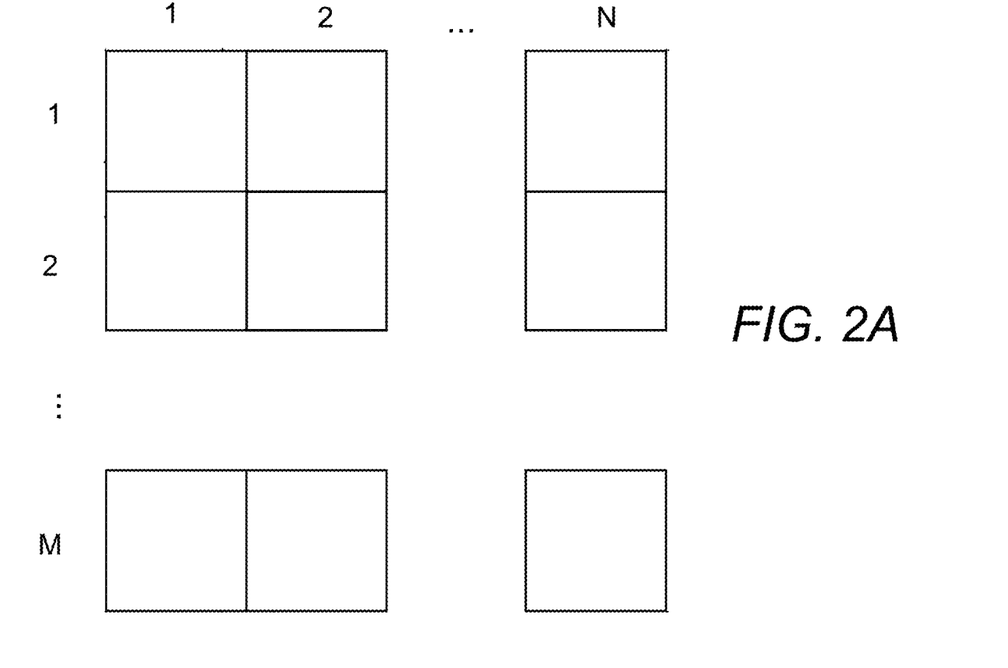
Figure 2B:
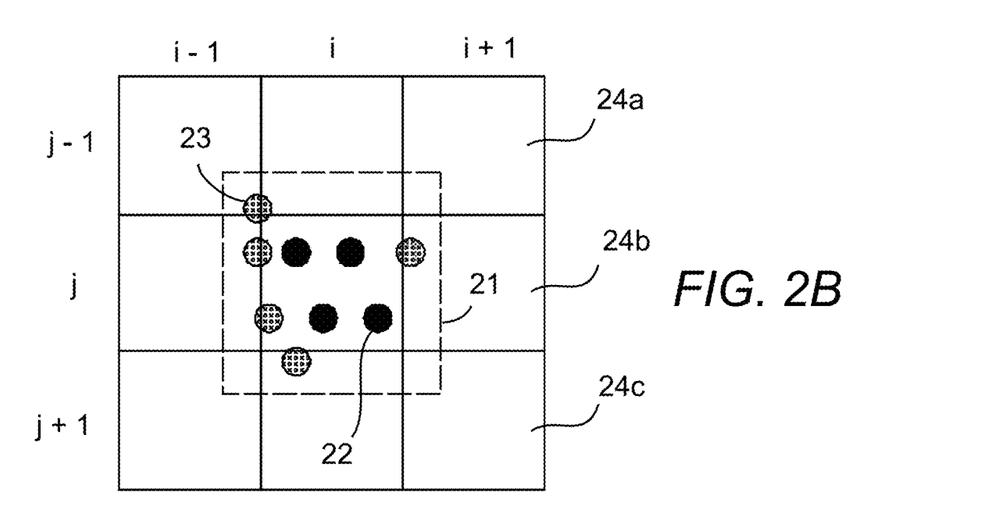

FIG. 2(A-B) illustrate the tile-based image processing scheme.

FIG. 2A shows an image divided into multiple tiles with a targeted tile located at (i, j) being processed. The targeted tile is surrounded by eight neighboring tiles on the grid (i−1<i+1, j−1<j+1). The targeted tile fully contains four objects (illustrated in black dots) and partially contains another five objects (illustrated in grey dots). To accurately quantify the amount of objects within a respective tile, the tile is processed along with a region of overlap with a neighboring tile. The size of the overlap is determined by the size of the objects to be detected and the reach of the image analysis algorithms used for the processing. The idea is that all objects that are located on the boundary of a tile (contained within two or more tiles) are detected and characterized identically in each of those tiles, respectively. An object location criterion is used to associate every object to only a single tile.

FIG. 2B shows the image divided up into M×N tiles. The image data for the processing of each tile includes a four-sided overlap with its up to 8-neighborhood tiles. Note that each tile with its four-sided overlap region can be processed in parallel.

To obtain a finer grid with more and smaller tiles, multiple object tiles can be constructed from a single processing tile. To obtain a coarser grid with less and larger tiles, the objects from multiple processing tiles can be combined to a single object tile.

Figure 3:
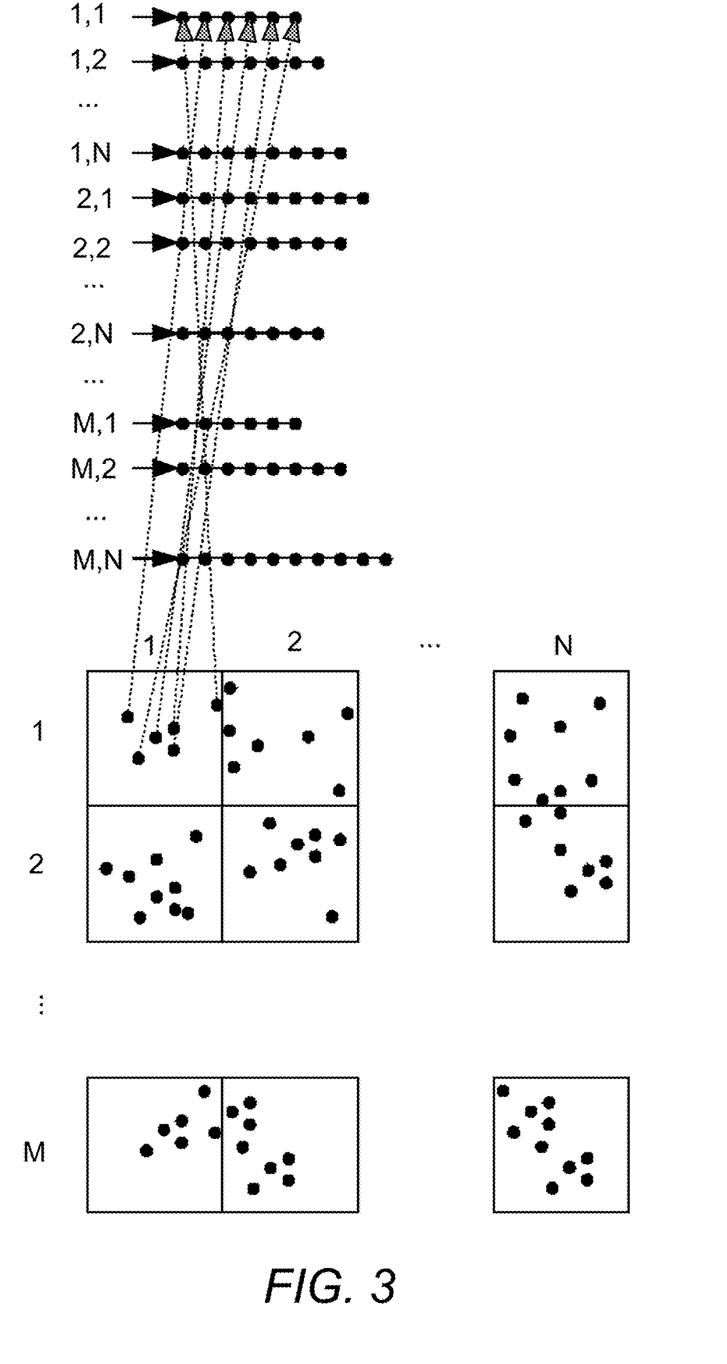
FIG. 3 illustrates a process for detecting objects in a digital image and storing the objects in a tile-based data structure.

FIG. 3 illustrates how the objects detected in different tiles of an image are stored in a tile-based data structure. The objects detected in each tile are stored together in the data structure. The objects belonging to a tile can be accessed directly using the tile indices.

Figure 4:
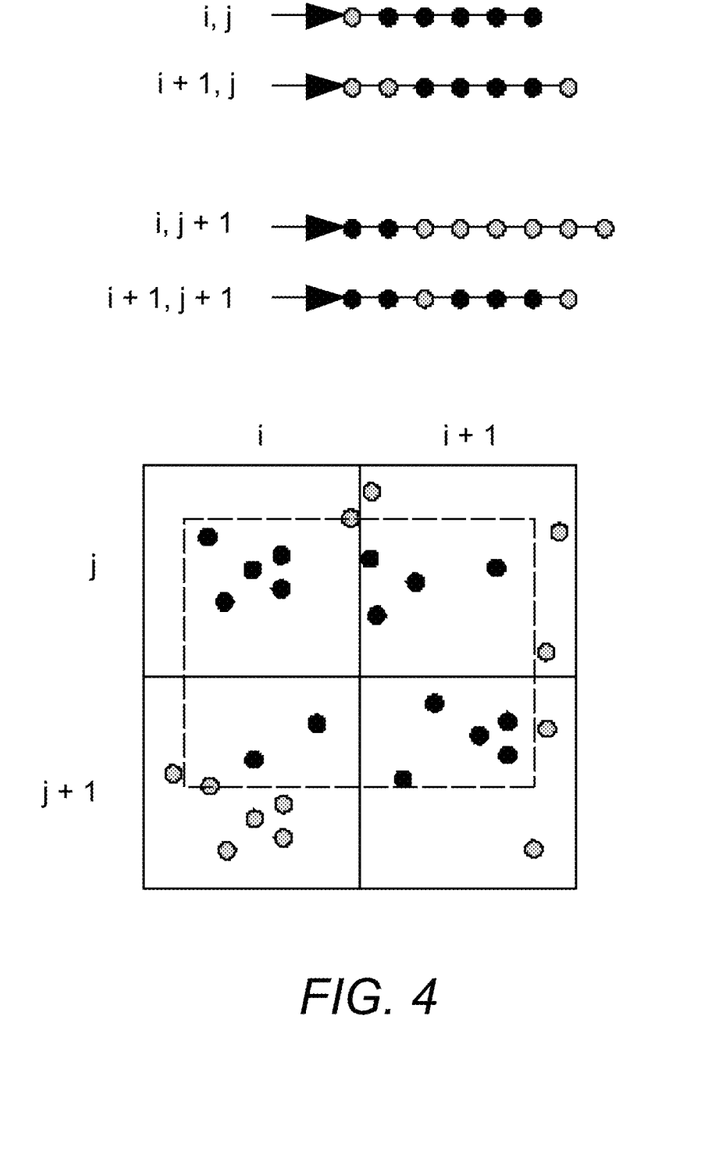
FIG. 4 illustrates a process for identifying objects in a region of the image within a tile-based data structure.

FIG. 4 illustrates how the objects in a region of the image are identified in the tile-based data structure. From the image coordinates of the region and the tiles, the tile indices of those tiles that overlap with the region are determined and the objects of all those tiles are loaded. From the image coordinates of the region and the objects, the objects are selected that fall into the region.

Many image analysis tools for microscopy are looking at the analysis of cells, where the objects would be the cells. Tissue analysis expands the concept of analyzing an image of a slide to analyzing multiple images from consecutive tissue sections.

Specific image analysis applications that would benefit from the presented systems and methods include, but are not limited to:
 defining or re-defining the region-of-analysis;
 re-classification of cells and re-scoring of slides;
 cell population analysis or analysis of individual cells;
 inclusion and exclusion gating of cells;
 display of object data (including heat maps); and
 training and application of pattern recognition tools.

For data storage optimization, the gating of cells can restrict the cell data to the cells of interest and the display of object data can eliminate the need for markup or overlay images.

Figure 5:
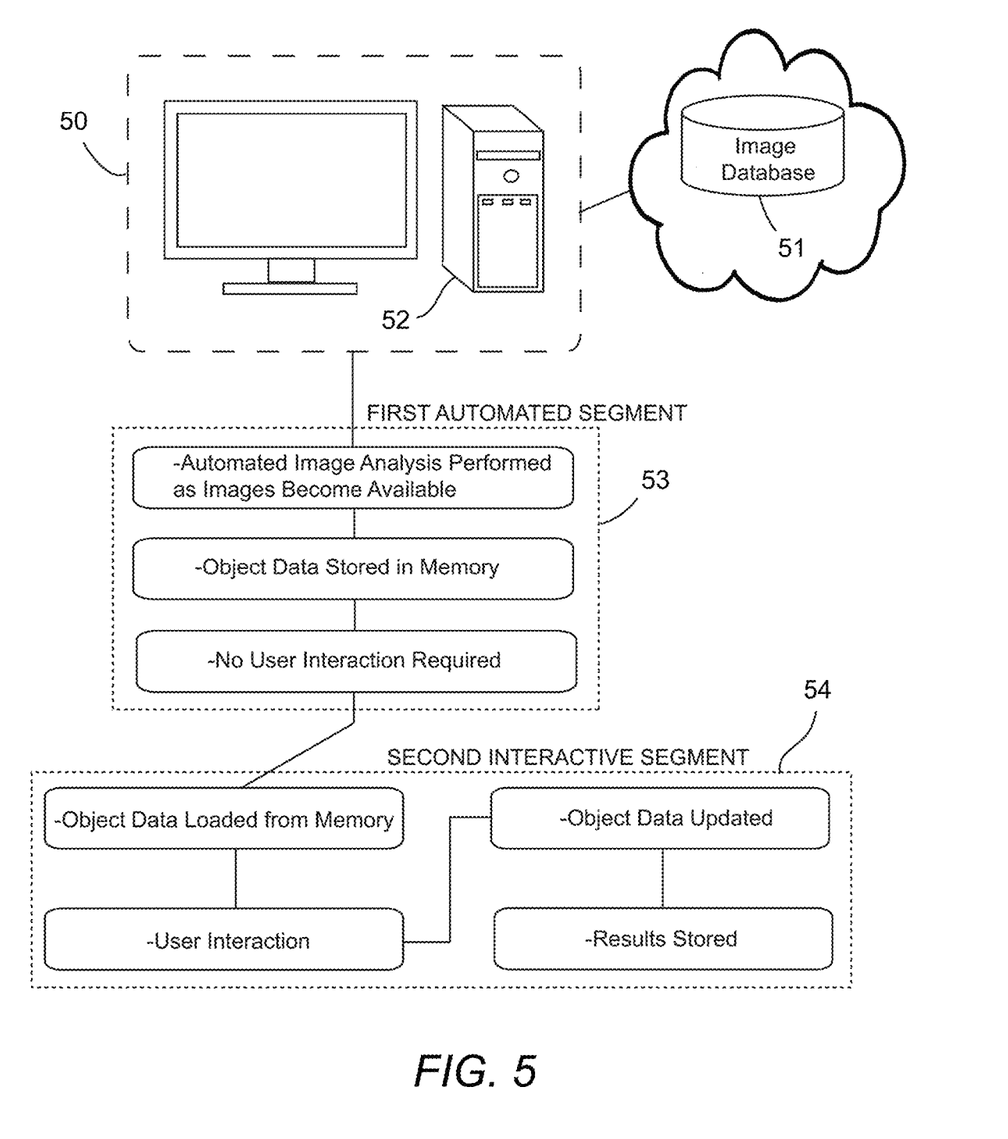
FIG. 5 shows a data processing system for aid of a pathologist in manual workflow involving review, analysis and reporting on microscopic images of tissue specimens and associated data, the system being programmed to perform the analysis of images in at least two segments including a first automated segment and a second interactive segment.

In accordance with an embodiment as illustrated in FIG. 5, a data processing system 50 is provided for aid of a pathologist in a digital pathology workflow involving image analysis tools to analyze microscopic images of tissue specimens and associated data. The data processing system 50 includes: a source of digital image data representing images of the tissue specimens; an image database 51 containing memory for storing the digital image data, object data and analysis results associated with the image data; and a computer workstation 52 comprising at least one processor coupled to the database for executing the image analysis tools and allowing users to provide user input; the computer workstation 52 is programmed to: perform a first segment 53 of automated programs for detecting and quantifying the objects in the images and storing the object data in the database, not requiring any user input; and perform a second segment 54 of interactive programs for further processing the object data of the images and storing the analysis results in the database, processing the object data from the first segment 53 and accepting user input.

EXAMPLE

For illustrative purposes, one example may include the quantitative analysis of progesterone receptors in breast tissue. The image analysis task that needs to be performed consists of detecting the nuclei of invasive tumor cells, measuring the mean optical density of the progesterone preceptor staining on the nuclei and then classifying the nuclei into 4 categories (0—negative, 1—low positive, 2—medium positive, and 3—high positive) based on the amount of progesterone preceptor staining. From the percentages of nuclei in the different categories an H-score is calculated, which essentially is the average category of the nuclei times 100. The program is not able to detect the invasive tumor cells automatically, therefore a user needs to determine which of the cells are invasive tumor cells.

The automated low-level image analysis program detects all nuclei on the entire slide, quantifies the progesterone preceptor staining and provides the classification of the nuclei. The objects in this application are the cell nuclei that also include the information about their classification.

The control logic for the execution of the low-level image analysis programs is very simple and incorporates a single program per slide. A simple lookup table is used that triggers the execution of the program when the slide identifier is of tissue type "breast" and stain "progesterone receptor".

The interactive high-level image analysis program allows a user to designate the regions in the image that only include invasive tumor cells. The only processing required now is to identify the nuclei that are in those regions and to update the display and the image analysis results.

The tile-based data structure provides fast access to a slightly larger superset of nuclei from the tiles that overlap with a region. The nuclei in those regions are quickly identified using simple comparisons of the image coordinates. All these calculations are done at the nuclei level resulting in a close to real-time system response.

Figure 6:
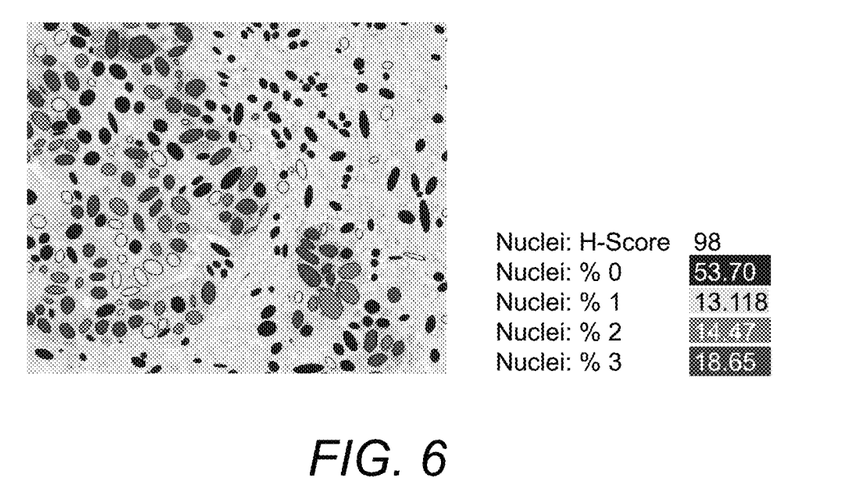
FIG. 6 shows results of an automated low-level image analysis of a slide image in accordance with an embodiment for the quantitative analysis of progesterone receptors in breast tissue.

FIG. 6 shows the "automated" low-level image analysis results for a region of an image in the example of quantitative analysis of progesterone receptors in breast tissue. All the nuclei have been detected and they are displayed using a color code for their classification (0—blue, 1—yellow, 2—orange, and 3—red). A breakdown of the percentages of nuclei per category and the resulting H-score are shown as well.

Figure 7:
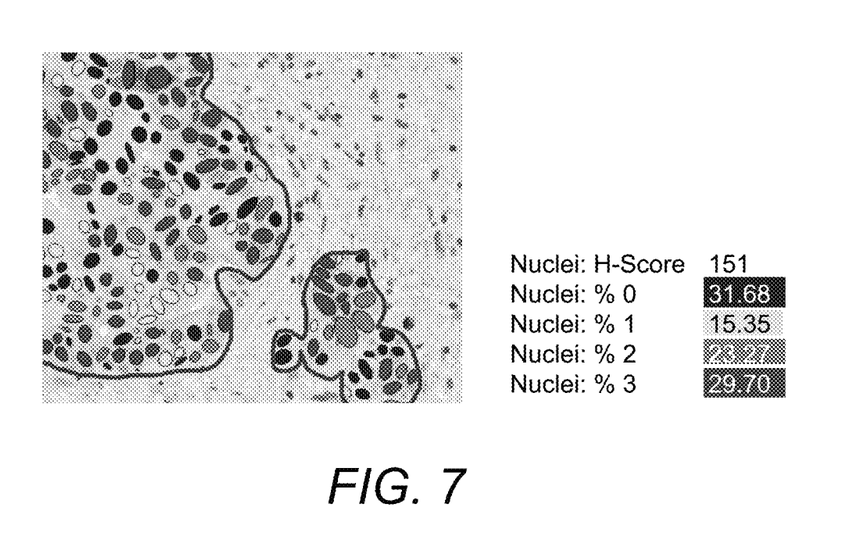
FIG. 7 shows results of an interactive high-level image analysis of a slide image in accordance with an embodiment for the quantitative analysis of progesterone receptors in breast tissue.

FIG. 7 shows the "interactive" high-level image analysis results in the same example of FIG. 5. Only the nuclei in the regions identified by the user are displayed and the breakdown of the percentages of nuclei per category and the resulting H-score are updated.

Although particular illustrative examples are contained herein, these examples are intended to enable those having skill in the art to make and use the claimed invention, and shall not be construed as limiting the spirit and scope of the invention as set forth in the appended claims.

What is claimed is:

1. A computerized method for analyzing data within a data processing system that is designed to aid a pathologist in a digital pathology workflow involving image analysis tools, the method comprising:
 providing a source of digital image data representing images of tissue specimens to be analyzed; and in the data processing system, performing a first segment of automated image analysis programs, said first segment including:
  detecting objects in the images,
  quantifying object data based on said detected objects, and storing the object data in a database,
  wherein said programs in the first segment are configured to operate without interactions from the pathologist;
 and performing a second segment of interactive image analysis programs, the second segment including:
  loading the stored object data from the database,
  accepting pathologist interactions,
  further processing the object data,
  and storing results in the database,
 said first segment further comprising: partitioning at least one of the images into two or more respective tiles, and processing each of the two or more respective tiles wherein for each respective tile, the respective tile is processed along with a region of overlap with a neighboring tile and combining the object data of the respective tiles in order to identify the objects and quantify the object data associated therewith.

2. The method according to claim 1, further comprising: distributing the processing of the tiles onto multiple processors.

3. A data processing system configured to aid a pathologist in a digital pathology workflow involving image analysis tools, the system comprising:
 a source of digital image data representing images of tissue specimens to be analyzed;
 a database containing memory for at least temporarily storing each of: the digital image data, object data associated with the digital image data, and analysis results based on the object data;

and a computer workstation comprising at least one processor coupled to the database f or executing the image analysis tools and accepting interactions of the pathologist;

said computer workstation configured to:
perform a first segment of automated image analysis programs, said first segment including:
detecting objects in the images,
quantifying object data based on said detected objects,
and storing the object data in a database,
wherein said programs in the first segment are configured to operate without interactions from the pathologist;
and perform a second segment of interactive image analysis programs, the second segment including:
loading the stored object data from the database,
accepting pathologist interactions, further processing the object data,
and storing results in the database,
said first segment further comprising: partitioning at least one of the images into two or more respective tiles, and processing each of the two or more respective tiles wherein for each respective tile, the respective tile is processed along with a region of overlap with a neighboring tile and combining the object data of the respective tiles in order to identify the objects and quantify the object data associated therewith.

4. The system of claim 3, wherein the first segment of automated image analysis programs is executed automatically by the system upon availability of images in the database.

5. The system of claim 3, said source of image data consisting of one or more microscope slides and a slide scanner coupled to the database, wherein the first segment of automated image analysis programs is executed in parallel with digitization of the slides by the slide scanner using a double-buffer technique.

6. The system of claim 3, wherein said tile-based processing further comprises: distributing the processing of the respective tiles onto multiple processors.

7. The system of claim 3 further programmed to identify the objects in said tile-based data format, each of the objects associated with a region within one of the images, the identification of objects in said tile-based data format comprising: comparing coordinates of the region with coordinates of the tiles and objects in the tile-based data.

8. The system of claim 3, wherein said image analysis tools perform the analysis of cells with said objects being cells.

9. The system of claim 3, wherein said image analysis tools perform the analysis of consecutive tissue slides.

10. The system of claim 3, wherein said second segment of interactive image analysis programs is configured for defining one or more regions-of-interest for the analysis.

11. The system of claim 3, wherein said second segment of interactive image analysis programs is configured to perform re-classification of objects and re-scoring of slides.

12. The system of claim 3, wherein said second segment of interactive image analysis programs is configured to perform at least one of: object population analysis or the analysis of individual objects.

13. The system of claim 3, wherein said second segment of interactive image analysis programs is configured to perform inclusion and exclusion gating of objects.

14. The system of claim 3, wherein said second segment of interactive image analysis programs is configured to perform the display of object data.

15. The system of claim 3, wherein said second segment of interactive image analysis programs is configured to perform training and application of pattern recognition tools based on object data.

16. The method according to claim 1 further comprising: determining the size of the region of overlap in accordance with the size of the objects to be detected.

17. The system of claim 3 said first segment further comprising: determining the size of the region of overlap in accordance with the size of the objects to be detected.

* * * * *